US012731002B2

(12) United States Patent
Cox

(10) Patent No.: US 12,731,002 B2
(45) Date of Patent: Sep. 8, 2026

(54) CORE LAYER COMPRISING SYSTEM-IN-PACKAGE, RESULTING INFORMATION CARRYING CARD, AND METHODS OF MAKING THE SAME

(71) Applicant: SentryCard Technologies, Inc., Chicago, IL (US)

(72) Inventor: Mark Cox, West Chester, PA (US)

(73) Assignee: SENTRYCARD TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 19/091,174

(22) Filed: Mar. 26, 2025

(65) Prior Publication Data

US 2025/0307593 A1 Oct. 2, 2025

Related U.S. Application Data

(60) Provisional application No. 63/570,956, filed on Mar. 28, 2024.

(51) Int. Cl.

*G06K 19/077* (2006.01)
*G06K 19/07* (2006.01)

(52) U.S. Cl.

CPC ... *G06K 19/07775* (2013.01); *G06K 19/0718* (2013.01); *G06K 19/072* (2013.01); *G06K 19/07705* (2013.01); *G06K 19/07756* (2013.01); *G06K 19/07777* (2013.01)

(58) Field of Classification Search

None
See application file for complete search history.

(56) References Cited

U.S. PATENT DOCUMENTS

| | | | | |
|---|---|---|---|---|
| 8,012,809 | B2 * | 9/2011 | Reed | G06K 19/07724 29/841 |
| 9,547,788 | B1 | 1/2017 | Ogirko et al. | |
| 10,783,422 | B2 | 9/2020 | Herslow et al. | |
| 11,310,060 | B1 | 4/2022 | Poelstra et al. | |
| 11,650,570 | B2 | 5/2023 | Cox | |
| 11,836,232 | B1 | 12/2023 | Durairaj et al. | |

(Continued)

OTHER PUBLICATIONS

International Search Report and Written Opinion issued for PCT/US2025/021540 dated Jun. 10, 2025, 19 pages.

*Primary Examiner* — Thien M Le
*Assistant Examiner* — April A Taylor
(74) *Attorney, Agent, or Firm* — DUANE MORRIS LLP

(57) ABSTRACT

The present disclosure provides a core sheet, a core layer comprising the core sheet for an information carrying card, an information carrying card comprising the same, and the methods of making the core sheet, the core layer, and the information carrying card. The core layer comprises a core sheet, which includes a substrate film and a plurality of component sections, Each component section comprises an antenna structure disposed on or embedded within the substrate film, and a system-in-package comprising at least one chip. The system-in-package is disposed on or embedded within the substrate film and electrically connected with the antenna structure. The antenna structure is made of a conductive material. The core layer further includes a cross-linked polymer composition disposed on both side of the substrate film. The substrate film may be centered in the crosslinked composition in a direction normal to a plane of the core layer.

30 Claims, 14 Drawing Sheets

(56) References Cited

U.S. PATENT DOCUMENTS

| | | | | |
|---|---|---|---|---|
| 11,900,197 | B1 * | 2/2024 | Tang | G06K 19/0723 |
| 2006/0158316 | A1 | 7/2006 | Eckstein | |
| 2006/0261454 | A1 * | 11/2006 | Takiar | G06K 19/07745 257/678 |
| 2010/0226107 | A1 * | 9/2010 | Rietzler | B29C 39/10 156/247 |
| 2011/0133895 | A1 | 6/2011 | Wu et al. | |
| 2011/0181470 | A1 | 7/2011 | Qiu et al. | |
| 2013/0255078 | A1 | 10/2013 | Cox | |
| 2014/0374489 | A1 | 12/2014 | Cox | |
| 2015/0161503 | A1 | 6/2015 | Finn | |
| 2017/0085562 | A1 | 3/2017 | Schultz et al. | |
| 2017/0344988 | A1 | 11/2017 | Cusden et al. | |
| 2018/0270065 | A1 | 9/2018 | Brown et al. | |
| 2019/0050618 | A1 | 2/2019 | Khuri-Yakub et al. | |
| 2019/0114526 | A1 | 4/2019 | Finn et al. | |
| 2019/0164156 | A1 | 5/2019 | Lindemann | |
| 2019/0197385 | A1 | 6/2019 | Finn et al. | |
| 2019/0286805 | A1 | 9/2019 | Law et al. | |
| 2019/0378142 | A1 | 12/2019 | Darnell et al. | |
| 2020/0004643 | A1 | 1/2020 | Yang | |
| 2020/0008085 | A1 | 1/2020 | Chakraborty et al. | |
| 2020/0084039 | A1 | 3/2020 | Chabanne et al. | |

* cited by examiner

2

2
40
20

2
40
20

CORE LAYER COMPRISING SYSTEM-IN-PACKAGE, RESULTING INFORMATION CARRYING CARD, AND METHODS OF MAKING THE SAME

PRIORITY CLAIM AND CROSS-REFERENCE

This application claims the benefit of U.S. Provisional Application No. 63/570,956, filed Mar. 28, 2024, which application is expressly incorporated by reference herein in its entirety.

FIELD OF THE INVENTION

The disclosure relates to information carrying cards such as smart cards generally. More particularly, the disclosed subject matter relates to a core sheet and a core layer for a plurality of information carrying card, the resulting information carrying cards, and the methods of making the same.

BACKGROUND

Information carrying cards provide identification, authentication, data storage and application processing. Such cards or parts include key cards, identification cards, telephone cards, credit cards, bankcards, tags, bar code strips, other smart cards and the like. Counterfeiting and information fraud associated with traditional plastic cards causes tens of billions of dollars in the losses each year. As a response, information carrying cards are getting “smarter” to enhance security. Smart card technologies provide solutions to prevent fraud and decrease resulting losses.

Information carrying cards often include an integrated circuit (IC) attached on or embedded in a thermoplastic material, such as polyvinyl chloride (PVC). Information has been input and stored in the integrated circuit before a transaction. In use, information carrying cards work in either a “contact” or “contactless” mode. In contact mode, an electronic component on the card is caused to directly contact a card reader or other information receiving device to establish an electromagnetic coupling. In contactless mode, the electromagnetic coupling between the card and the card reading device is established through electromagnetic action at a distance, without the need for physical contact. The process of inputting information into the IC of the information carrying card also works in either of these two modes.

When information carrying cards become “smarter,” the amount of information stored in each card often increases, and the complexity of the embedded IC’s also increases. In particular, when artificial intelligence become more popular, the amount of information stored in or communicated through each card tremendously increases. The cards also need to withstand flexing to protect sensitive electronic components from damage as well as offer good durability during use. In most of the existing technologies, as a final product, a card is made directly on a card body through a process such as injection molding, bonding, embedding, and encapsulation, in which electronic components are attached or mounted onto the card body or into a cavity on the card body. Such a cavity may have a size the same as or similar to the size of an inlay having the electronic components. Such existing methods can be seen in patents or published patent applications, for example, U.S. Pat. Nos. 5,520,863; 6,902,116; 8,012,809; US 2005/0006463; US 2006/0227523; US 2010/0226107; US 2010/0270373; and US 2012/0103508. The existing processes do not offer a large-scale manufacturing capability, and may not be suitable for sensitive components.

It is desired to have a relatively easy and full-scale commercial process having improved productivity at low cost and offering products with good quality and durability. It is also desired to make smart cards smarter with more functions.

SUMMARY OF THE INVENTION

The present disclosure provides a core sheet for one or a plurality of information carrying cards, a core layer comprising the core sheet, an information carrying card comprising the same, and the methods of making the core sheet, the core layer, and the information carrying card.

In accordance with some embodiments, a core layer is configured to be used for making a plurality of information carrying cards. Such a core layer comprises a substrate film, and a plurality of component sections, which together are referred as a core sheet. Each component section comprises an antenna structure disposed on or embedded within the substrate film, the antenna structure comprising a wire made of a conductive material, and a system-in-package (SiP) comprising at least one chip disposed on or embedded within the substrate film, and electrically connected with the antenna structure.

In some embodiments, the core layer further comprises a crosslinked polymer composition disposed on both side of the substrate film. The substrate film is centered in the crosslinked composition in a direction normal to a plane of the core layer. During a thermal lamination process for making the core layer, the core sheet self-centered in a cross-linkable polymer composition before the crosslinkable polymer composition is cured to become the crosslinked polymer composition.

Examples of a suitable substrate film include, but are not limited to, a polymer, a paper, plasticized paper, a composite, and any combination thereof. In some embodiments, the substrate film is a first thermoplastic layer made of a thermoplastic polymer.

In some embodiments, the antenna structure is made of a wire or a thread, which is made of a conductive material. In some embodiments, the conductive material comprises or is made of a metal. For example, the conductive material is made of copper or copper alloy. The conductive material such as copper or copper alloy is applied on the substrate film through vapor deposition, printing, cladding, or coating technique.

In some embodiments, the antenna structure and the system-in-package are connected by laser melting, wire bonding, or solder of the conductive material or by a conductive tape.

In some embodiments, the system-in-package comprises at least two or three chips for different functions. In some embodiments, the SiP includes at least three chips.

In some embodiments, the antenna structure is configured to generate energy through induction in magnetic field, and the core layer includes no battery. The antenna structure may be also configured to communicate with external readers or a cell phone. The information carrying card is configured to work with cell phones or external readers.

In some embodiments, the core layer further comprises a light emitting diode (LED) electrically connected with the SiP and the antenna. The LED can be organic LED (OLED).

In some embodiments, the core sheet is self-centered in a crosslinkable polymer during curing in a thermal lamination process under a temperature and a pressure.

The core sheet includes a first thermoplastic layer made of a thermoplastic polymer as a substrate, and an antenna structure disposed on or embedded within the first thermoplastic layer.

In another aspect, the present disclosure provides a method of making the core sheet as described herein. The antenna structure are formed as described herein. The SiP is applied and connected with the antenna structure as described herein.

In another aspect, the present disclosure provides a core layer as described herein.

In some embodiments, the core layer comprises a crosslinked polymer disposed on both side of the core layer. In some embodiments, the core sheet is self-centered in the crosslinked polymer before curing in a thermal lamination process under a temperature and a pressure. In such a method, a crosslinkable polymer in a liquid or paste form is applied to both sides of the core sheet in a press for thermal lamination. The press includes a height adjustment edges to define the thickness. During a curing process at a low temperature and under a pressure, the core sheet self-centers in the press with the help of the crosslinkable polymer.

In another aspect, the present disclosure provides a method of making the core layer as described herein.

In another aspect, the present disclosure provides an information carrying card comprising the core sheet or the core layer as described herein.

In another aspect, the present disclosure provides a method of making one or a plurality of the information carrying cards as described herein.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
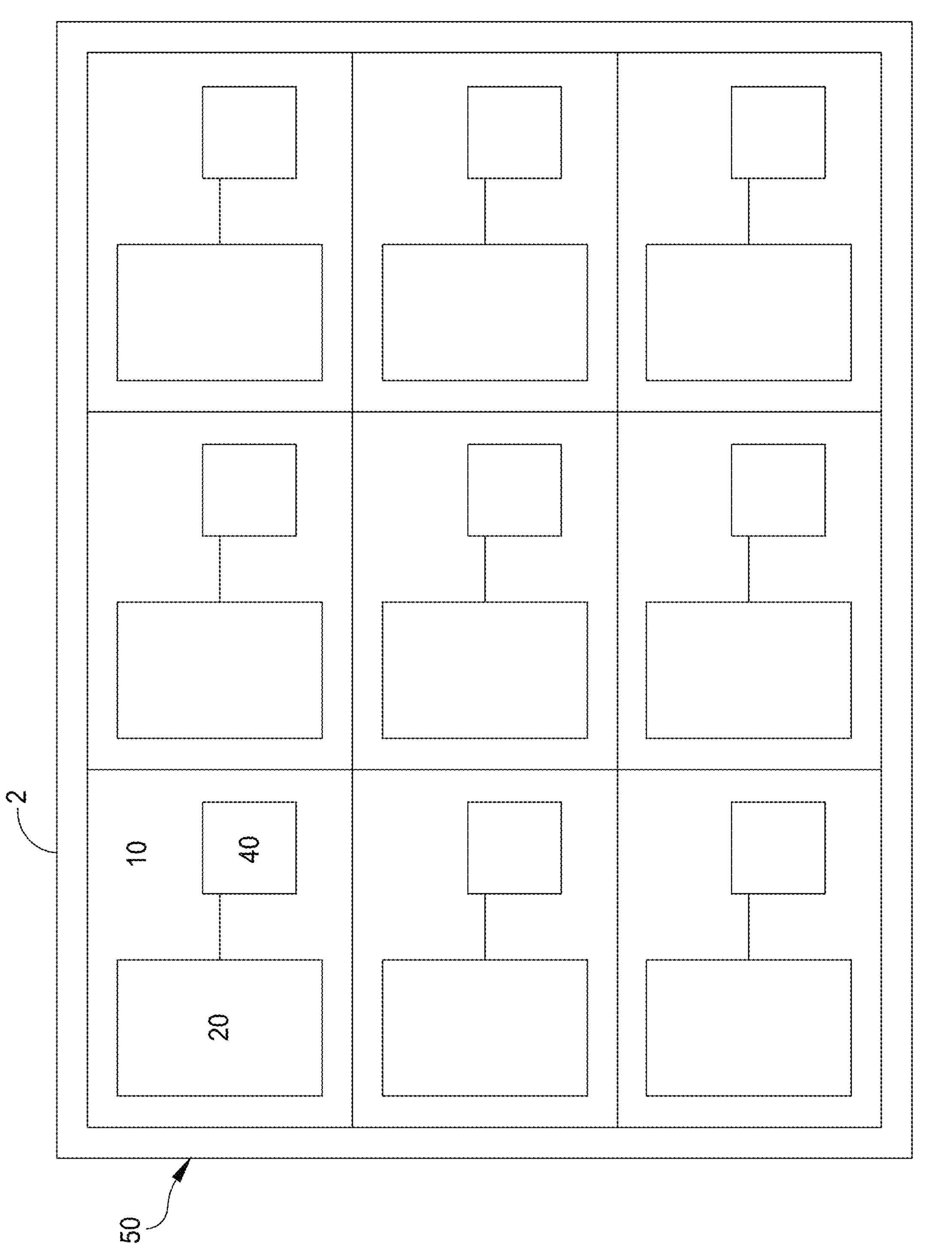
FIG. 1 is a plan view illustrating an exemplary core sheet comprising an exemplary system-in-package (SiP) disposed on a substrate in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to +10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The present disclosure provides a core sheet for one or more information carrying cards, a core layer comprising the core sheet, an information carrying card comprising the core sheet, an information carrying card comprising the core layer, and the methods of making the core sheet, the core layer, and the information carrying card. The core layer is configured for a plurality of information carrying card. The present disclosure also provides a core layer for a plurality of information carrying card.

The products and the methods described herein are different from those in the existing technologies, for example, attaching or embedding an electronic device or a circuit board on the surface of a card substrate (or card body) or within a hole in the card substrate (or card body). In the present disclosure, a core sheet comprising a system-in-package (SiP) and other electronic components such as antenna is disposed inside a crosslinked polymer composition through a low-temperature process to provide a core layer for a plurality of information carrying cards. No circuit board or a device with complicated packaging is used. The resulting core layer and the information carrying card have unique structure, and have high flexibility, performance, durability, and moisture resistance. The methods described herein are easy, very efficient, and highly economical.

Referring to FIG. 1, an exemplary core sheet 50 including a plurality of core sheet section 10 is illustrated. Each core sheet section 10 comprises an antenna structure 20 and an exemplary system-in-package (SiP) 40. The antenna structure 20 and the SiP 40 are electrically connected with each other, and are disposed on a substrate 2. The antenna structure 20 and the SiP 40 may also be partially embedded in the substrate 2. The substrate 2 may be a film. The substrate 2 may be considered as part of the exemplary core sheet 50. The exemplary core sheet 50 may refer to the structures with or without the substrate 2.

Figure 2:
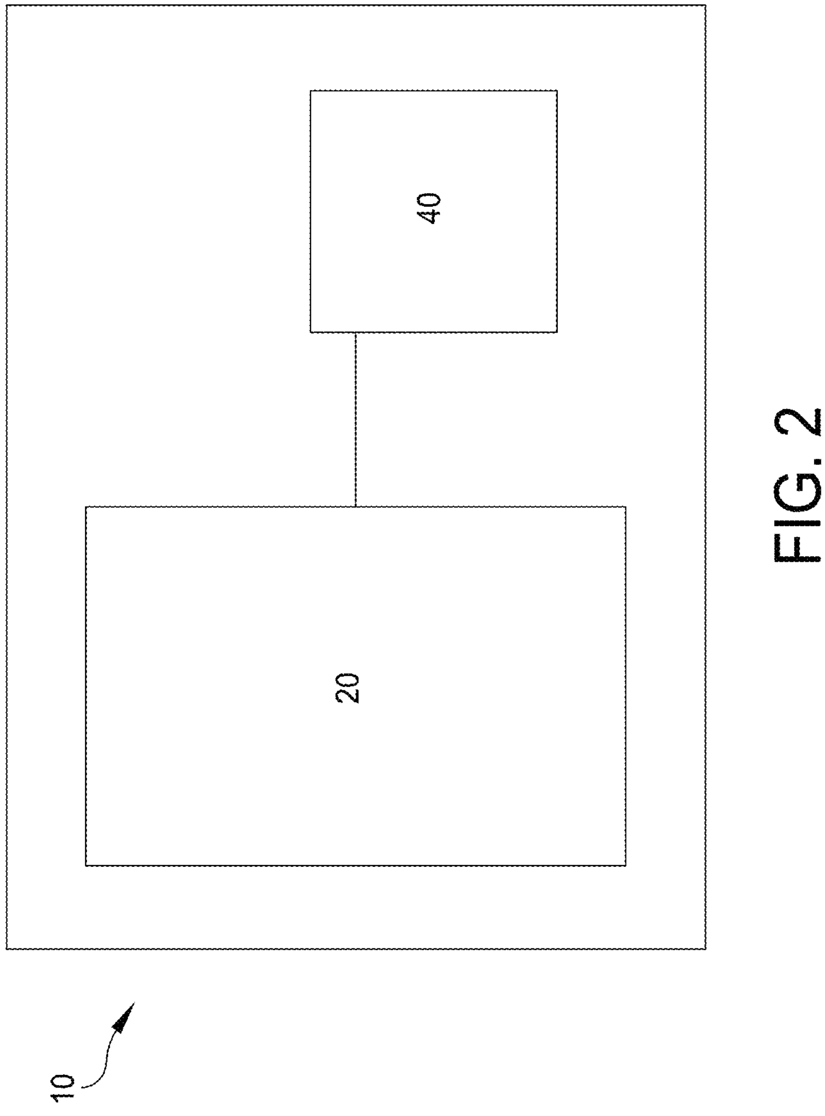
FIG. 2 is a plan view illustrating one section of the exemplary core sheet of FIG. 1 comprising an antenna structure and a system-in-package in accordance with some embodiments.

Referring to FIG. 2, one section of the exemplary core sheet 50 of FIG. 1 is illustrated, and such a section 10 of a core sheet corresponds to one information carrying card to be made later. For example, nine core sheet sections are for illustration purpose and nine core sheet sections are configured for nine information carrying card made simultaneously. In the manufacturing process, the number of the core sheet sections is much higher. The number of core sheet sections may be any integer higher than one, for example, in the range of from 1 to 100.

The plurality of component sections 10 together are referred as a core sheet 50. Each component section 10 comprises an antenna structure 20 disposed on or embedded within the substrate film 2. The antenna structure 20 comprises a wire made of a conductive material. Each section 10 further comprises a system-in-package (SiP) 40 comprising at least one chip disposed on or embedded within the substrate film 2, and electrically connected with the antenna structure 20. The at least one chip may be two or three chips in some embodiments. Except internal stacking or packaging inside the SiP, the chips and the SiP used may not include any additional packaging or wire bonding.

In some embodiments, the antenna structure 20 is made of a wire or a thread, and the conductive material is made of a metal or metal alloy. For example, the conductive material is made of copper or copper alloy. The conductive material such as copper can be applied or formed using any suitable techniques, for example, vapor deposition, printing, or cladding. Wire or copper clad is etched into the substrate film.

The antenna structure 20 includes a wire made of a conductive material and comprises a first antenna portion including a first number of loops and configured to communicate with a RF frequency.

In some embodiments, the antenna structure 20 is configured to generate energy through induction in magnetic field, and the core layer 100 includes no battery. The antenna structure 20 may be configured to generate power and/or communicate with external readers or cell phones. The information carrying card 110 is configured to work with cell phones in some embodiments.

A system in a package (SiP) or system-in-package, other than a circuit board, is used. A SiP includes a number of integrated circuits (ICs) enclosed in one chip carrier package or encompassing an IC package substrate that may include passive components and perform the functions of an entire system. The ICs may be stacked using package on package, placed side by side, and/or embedded in the substrate. A SiP may include more than two chips for different functions. Different chips may be electrically or wirelessly connected with each other.

In existing technologies related to integrated circuits, complicated manufacturing and packaging processes are needed. These processes may include, but are not limited to, flip-chip, wire bonding, embedded packaging, or embedded chip technologies. However, using the SiP and other components and related processes, those complicated manufacturing and packaging processes are not needed. The methods provided in the present disclosure provide easy solution for mass production. The products provide more functions and have good flexibility and durability.

In some embodiments, the antenna structure 20 and the system-in-package 40 are connected by laser melting of the conductive material or by a conductive tape. The bonding technique may be a wire bonding or soldering process. In some embodiments, a bonding using a conductive film such as Anisotropic Conductive Film (ACF) can be performed automatically on a machine.

The electrical connection in the core sheet is made through laser melting of metal or through a conductive film or tape. No frame bond is used. In some embodiments, the electrical connection is made through printed metal wires such as copper wires.

ACF, which represents "Anisotropic Conductive Film" or "Anisotropic Conductive Adhesive Film," is made of resins, such as thermoset epoxy resin, in which conductive particles are dispersed. ACF fixed by thermocompression bonding can achieve conductivity vertically, or in the direction of compression, and insulation quality horizontally, or in the perpendicular direction to compression, and because of its anisotropic nature, the material is referred to as "Anisotropic Conductive Film."

ACF is used to electrically connect the wire from the antenna structure and the system-in-package (SiP), and fix them.

In some embodiments, ACF used is about 10-45 μm thick and 0.4-20 mm wide. To connect the antenna structure and the SiP, ACF is placed between the electrodes and thermo-compression is applied. Through this process, conductive particles are compressed, touch one another, and form a conductive path between the upper and lower electrodes. Meanwhile, some particles remain uncompressed and dispersed in the resin, maintaining the electrodes' insulation quality in a horizontal direction. As the resin hardens in this state, the electrodes also become physically joined, fixed, and sealed.

Compared with bonding by solder or connector parts, the use of ACF in connecting electrodes (hereinafter, "ACF connection") can make the combined area smaller, thinner, flatter, and the pitches narrower. Other notable merits include the simultaneous connection of multiple electrodes. ACF also works at low temperatures between 90 and 240 degrees Celsius and in a short time of 4 to 60 seconds.

ACF is available from RESONAC. By developing conductive particles, resin materials, and dispersing technology further, reduction in the connection pitch to 100 μm or smaller. The company's Particle-Aligned Anisotropic Conductive Film ("PAL-ACF") utilizes the technology of dispersing conductive particles evenly in the film. TRESONAC's ACF "ANOSOLM" has achieved a connection pitch of 20 μm with these technologies.

In some embodiments, an ACF of 0.0254 mm thick is used. A processing temperature between 90° C. to 100° C. is used when the connections are made.

In some embodiments, the system-in-package comprises at least two or three chips for different functions. In some embodiments, as illustrated in FIG. 3, the SiP includes at least three chips for three different functions.

Figure 3:
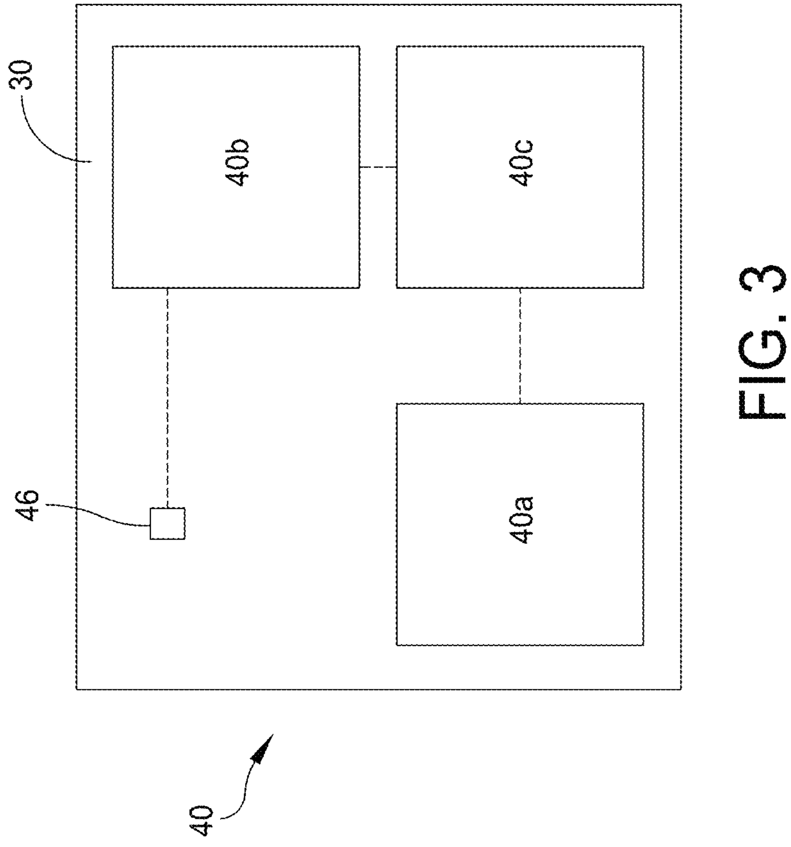
FIG. 3 is a diagram illustrating one exemplary system-in-package in accordance with some embodiments.

Referring to FIG. 3, one exemplary system-in-package 40 comprising multiple chips such as three chips 40*a*, 40*b*, and 40*c* is illustrated. Three chips are electrically through connections (not shown) or wirelessly connected. Optionally the three chips may be disposed on a base layer 30 or directly disposed on the substrate 2.

Each of the three chips 40*a*, 40*b*, and 40*c* may be a microcontroller in some embodiments. Chip 40*a* is encoded with security protocols. Chip 40*c* is a biometric sensor having a surface configured to be touched by a finger of a card holder, and may also include a microcontroller disposed underneath of the biometric sensor. Chip 40*c* is configured to be turned on by the power generated in the antenna structure 20 and is configured to collect biometric patterns such as fingerprinting pattern of the card holder. The biometric patterns are security features used to determine and verify the identity of the card holder. Chip 40*b* is configured to accept the data of the biometric patterns collected. The data or information of the biometric patterns is loaded into Chip 40*b*. The biometric patterns collected on-site is compared to profiles in the security protocols in Chip 40*a*. When the biometric patterns collected matches with the identity of the card holder, the resulting information carrying card will be turned on for further operations such as payments or permission granted to the card holder to perform operations such as entering a building or any other operations requiring security check.

In some embodiments, the size of Chip 40*c* is larger than that of Chips 40*b* and 40*c*.

In some embodiments, each section 10 of the core sheet 50 further comprises at least one light emitting diode (LED) electrically connected with the antenna 20 and the SiP 40. The LED may be a part of the SiP 40. The at least one light emitting diode (LED) is configured to emit green or red light indicating whether the biometric pattern matches or mismatches for authentication purpose. The LED is an organic light emitting diode (OLED) in some embodiments.

Figure 4:
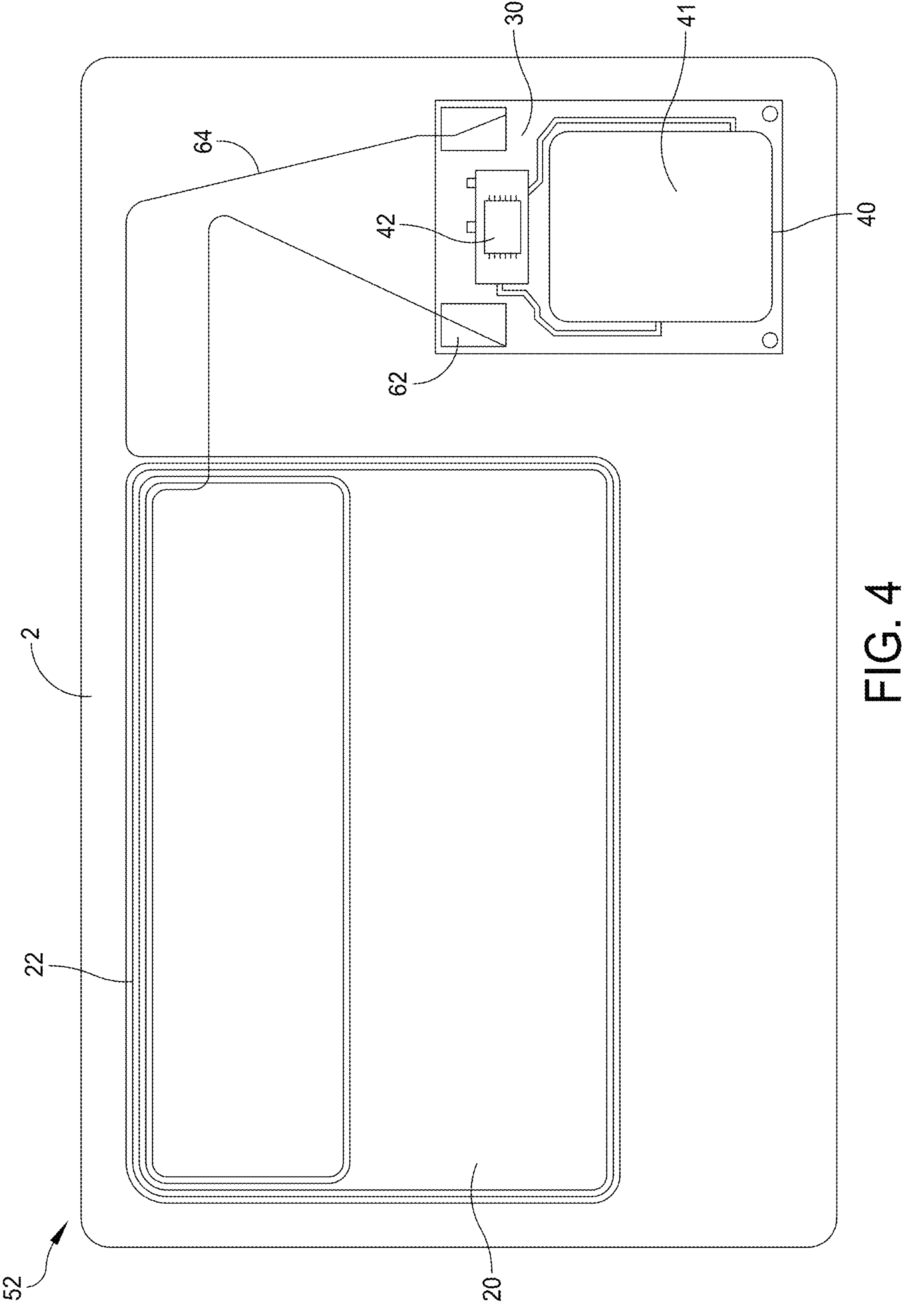
FIG. 4 is a plan view illustrating one example of an exemplary core sheet comprising an antenna structure and an exemplary system-in-package in accordance with some embodiments.
Figure 5:
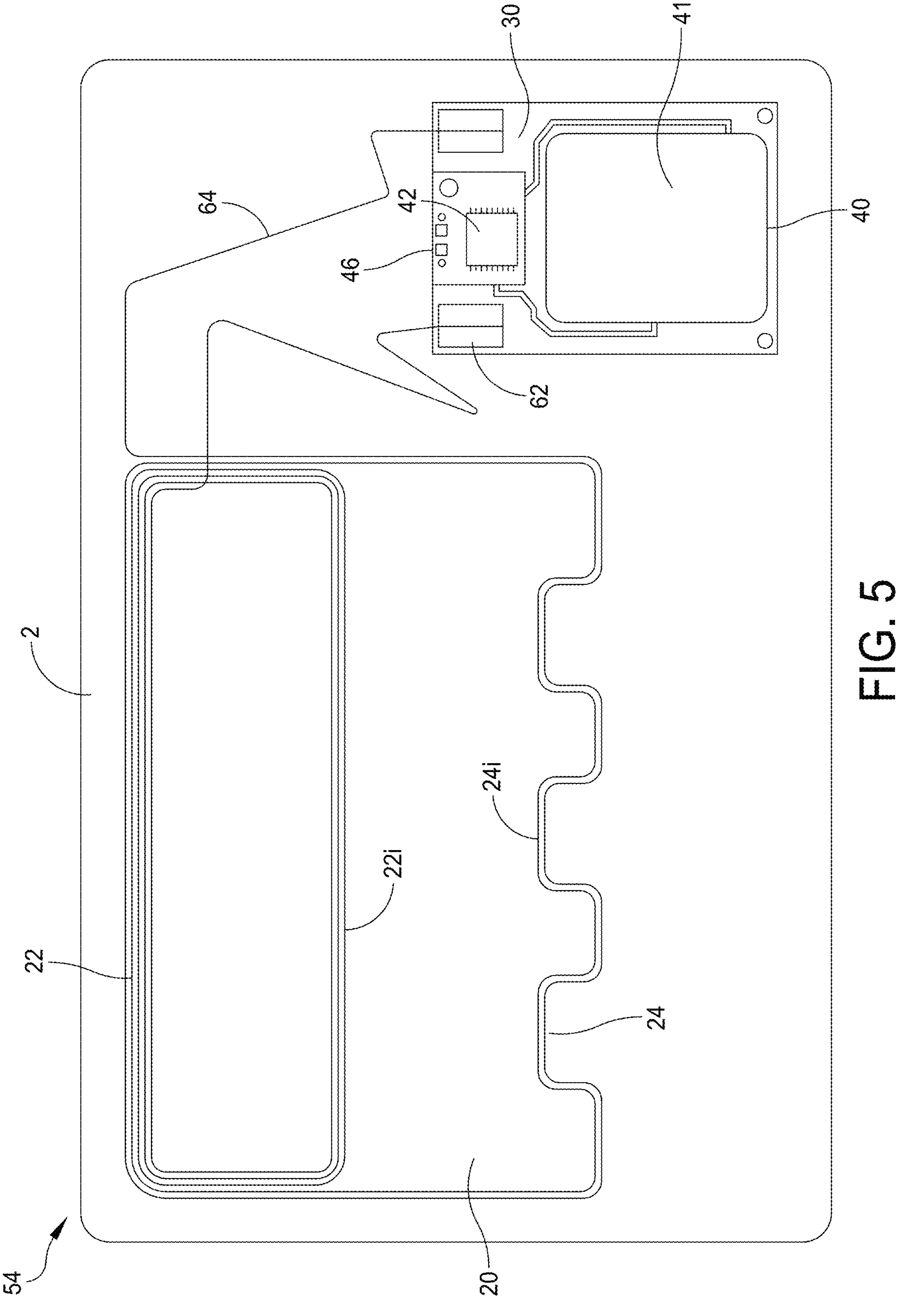
FIG. 5 is a plan view illustrating another example of an exemplary core sheet comprising an antenna structure and an exemplary system-in-package in accordance with some embodiments.

FIGS. 4-5 illustrate two examples of one section of an exemplary core sheet 50 in accordance with some embodiments.

Referring to FIGS. 4 and 5, one section of an exemplary core sheet 52 is illustrated. Each of the core sheet 52 and 54 comprises an antenna structure 20 and an exemplary system-in-package (SiP) 40 disposed on a substrate 2. The antenna structure 20 and the SiP 40 are electrically connected with each other through conductive pads 62 and wires 64. The antenna structure 20 and the SiP 40 may also be partially embedded in the substrate 2. The substrate 2 is a thermoplastic layer made of a thermoplastic polymer. The SiP 40 may also include at least two chips such as Chips 41 and 42 disposed on a base layer 30. As illustrated in FIG. 5, Chip 41 is the same as Chip 40*c* described in FIG. 3 and comprises a biometric sensor, and Chip 42 is the same as Chip 40*b* described in FIG. 3 or a combination of Chips 40*a* and 40*b* as described in FIG. 3. The base layer 30 is a polymer film in some embodiments. The base layer 30 is optional, and the chips may be disposed directly on the substrate 2. Referring to FIG. 5, the core sheet may include at least one light emitting diode 46 as described herein.

The antenna structure 20 includes a wire made of a conductive material such as copper or copper alloy. As illustrated in FIG. 4, the antenna structure 20 may include a first antenna portion 22 including a first number of loops, for example, five loops as illustrated in FIG. 4.

Referring to FIG. 5, the exemplary antenna structure 20 includes a first antenna portion 22 including a first number of loops 22*i*, and a second antenna portion 24 including at least one portion having a waveform structure 24*i*. The first portion 22 is configured to communicate with a first RF frequency. The waveform structure 24*i* is configured to communicate with a second RF frequency and utilize eddy current from an external device to power the information carrying card. No battery is needed for the information carrying card. The second RF frequency is higher than the first RF frequency.

Referring to FIGS. 6-10, the methods of making the core sheet 50 and the core layer 100 comprising the core sheet 50 are illustrated.

Figures 6, 7, 8:
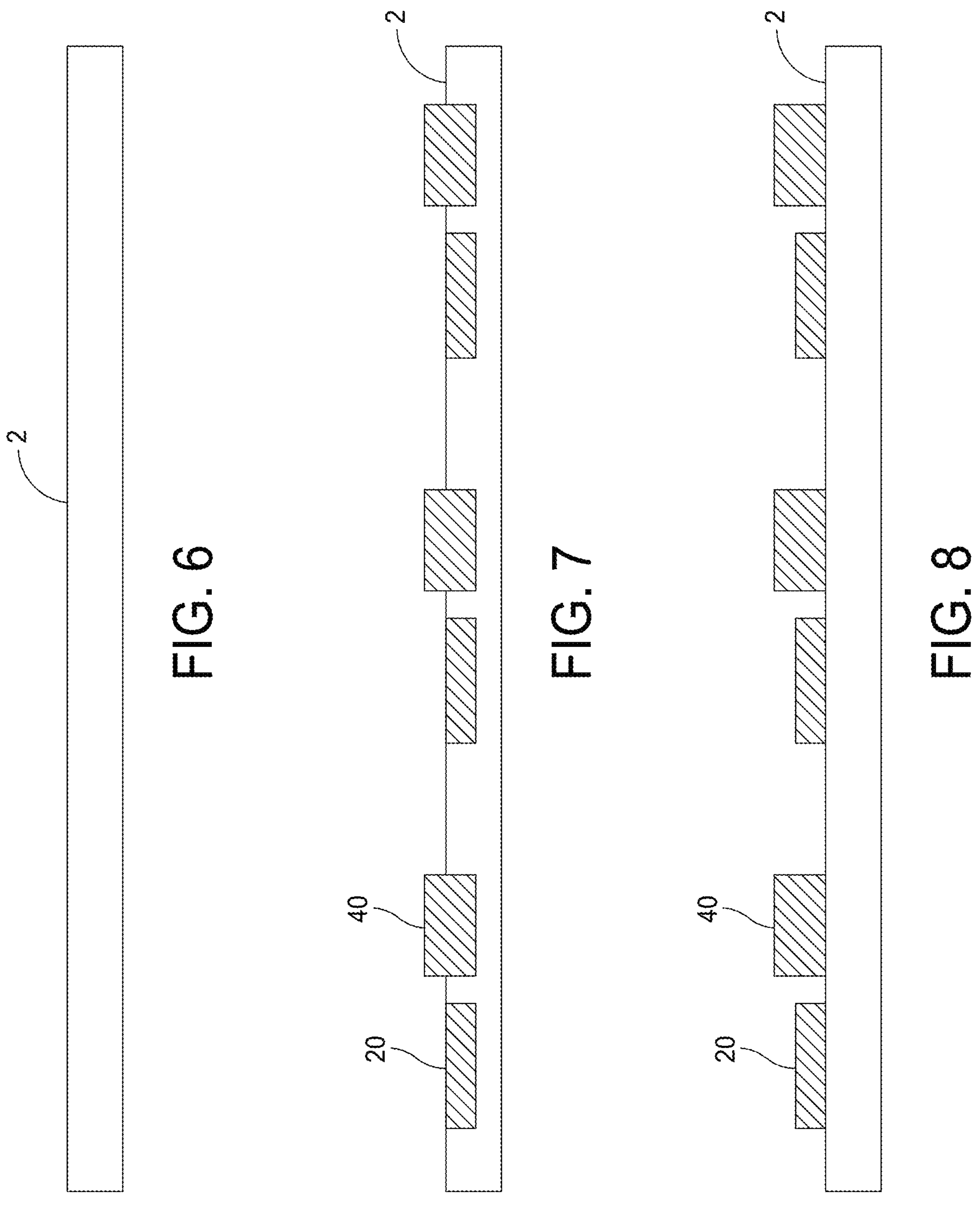
FIG. 6 is a sectional view illustrating a substrate such as a thermoplastic layer, a paper or any other suitable film in accordance with some embodiments.
FIG. 7 is a sectional view illustrating an exemplary core sheet comprising an antenna structure and an exemplary system-in-package, which can be at least partially embedded in the substrate in accordance with some embodiments.
FIG. 8 is a sectional view illustrating an exemplary core sheet comprising an antenna structure and an exemplary system-in-package, which can be disposed on the substrate in accordance with some embodiments.

Referring to FIG. 6, a substrate film 2 is illustrated. Examples of a suitable substrate film 2 include, but are not limited to, a polymer, a paper, plasticized paper, a composite, and any combination thereof. The substrate film can be any other material that can have or create to have molding properties or adhesive abilities. For example, an adhesive sheet can be also used. In some embodiments, an adhesive or adhesion promoter can be used on the substrate film 2 to achieve high bonding strength.

In some embodiments, the substrate 2 is a film. The substrate is a first thermoplastic layer comprises or is made of a thermoplastic polymer. Examples of a suitable first thermoplastic layer include, but are not limited to, polyvinyl chloride (PVC), a copolymer of vinyl chloride, polyolefin, polycarbonate, polyester, polyamide, acrylonitrile butadiene styrene copolymer (ABS), and the like or a combination thereof. The first thermoplastic layer may be a PVC, a copolymer of vinyl chloride and another monomer such as vinyl ether, vinyl ester or vinyl acetate, or a PVC modified with a vinyl chloride copolymer. Examples of PVC films suitable for use are available from suppliers such as Klockner Pentaplast of America, Inc. of Gordonsville, VA; and Shijiazhuang Eurochem Co. Ltd of China. Examples of such a vinyl chloride copolymer resin are available from Dow Chemical Company under trade name of UCAR®, and from BASF of Ludwigshafen, Germany under trade name of LAROFLEX®. UCAR® is a copolymer of vinyl chloride and vinyl acetate, and includes grades such as YYNS-3, VYHH and VYHD. LAROFLEX® is a copolymer of vinyl chloride and vinyl isobutyl ether, and includes grades such as MP25, MP 35, MP45 and MP60. These polymer resins may be supplied as fine powder, which is added to modify PVC resins for films. In some embodiments, such a thermoplastic layer can be transparent or translucent.

Referring to FIGS. 4-5 and 7-8, the antenna structure 20 is disposed on or embedded within the substrate film 2. As illustrated in FIG. 7, the antenna structure 20 is at least partially embedded within the substrate film 2 in some embodiments. As illustrated in FIG. 8, the antenna structure 20 is disposed on the substrate film 2. Similarly, the SiP 40 may be disposed on or embedded within the substrate film 2 as illustrated in FIGS. 7-8.

In some embodiments, the antenna structure 20 is made of a wire or a thread, and the conductive material is made of a metal or metal alloy. For example, the conductive material is made of copper or copper alloy. The conductive material such as copper can be applied or formed using any suitable techniques, for example, vapor deposition, printing, or cladding. Wire or copper clad is etched into the substrate film.

Figure 9:
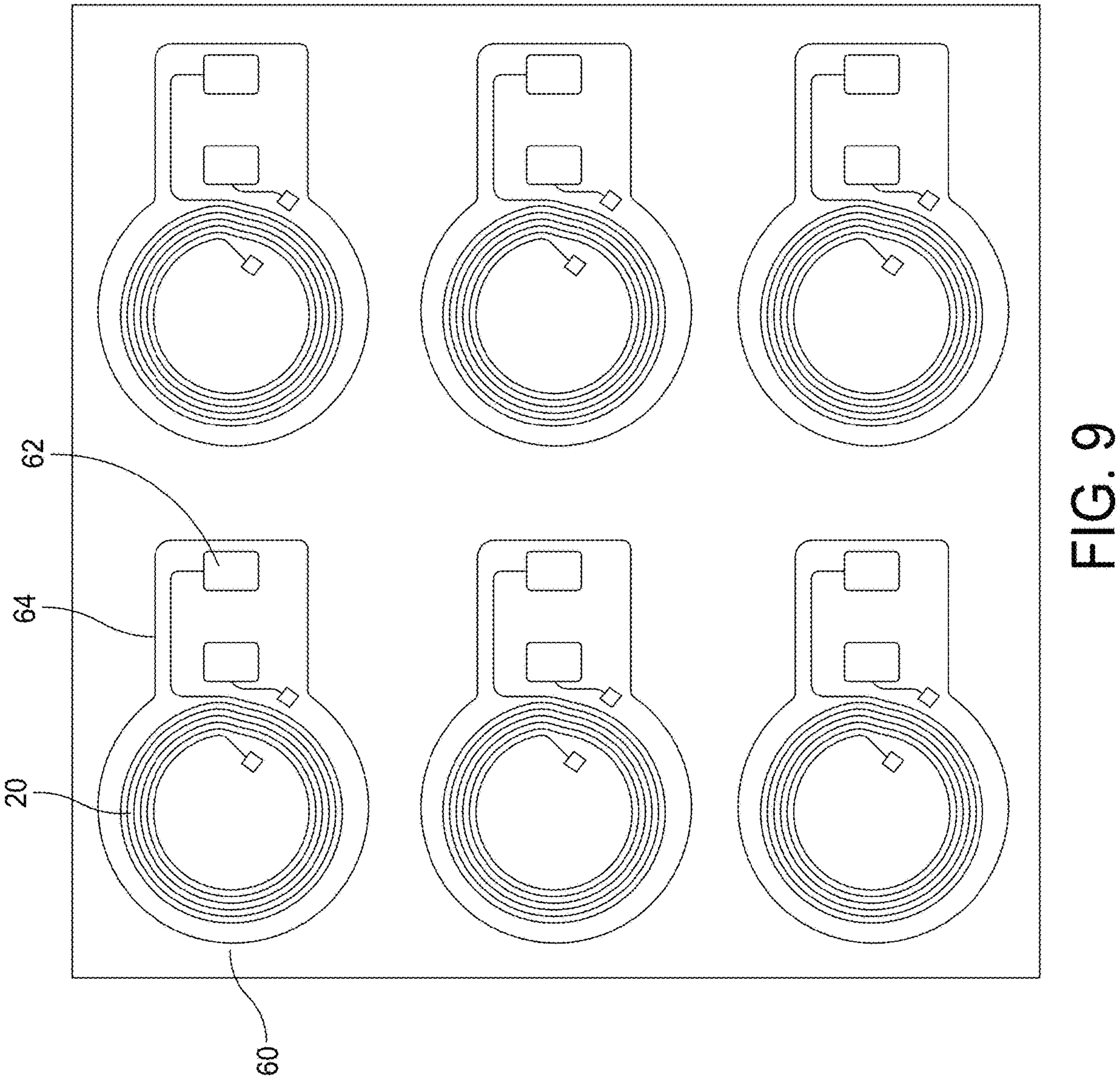
FIG. 9 is a plan view illustrating a plurality of antenna structures and interconnects comprising a conductive material such as metal or metal alloy printed on the substrate in accordance with some embodiments.
Figure 12:
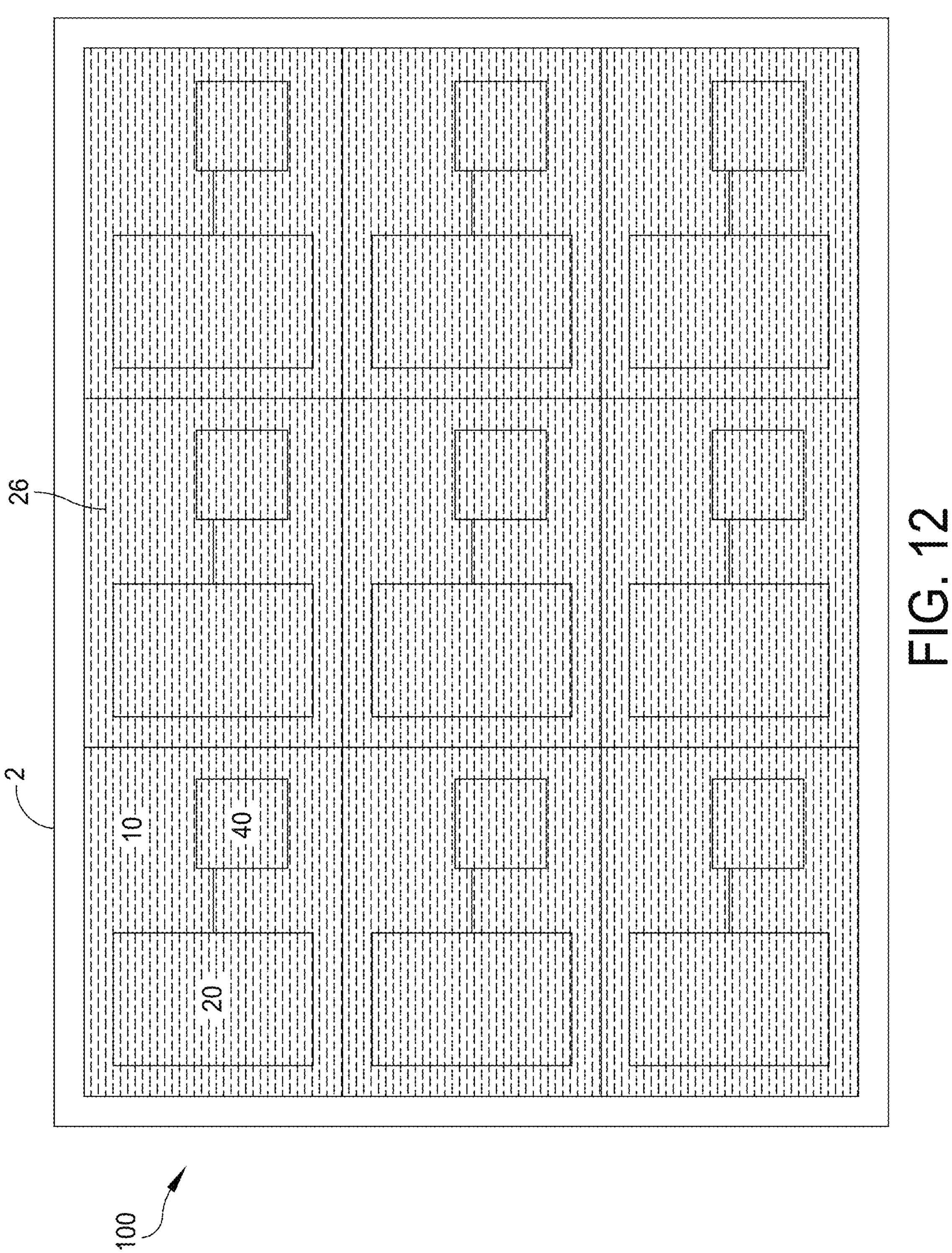
FIG. 12 is a plan view illustrating the exemplary core (or core layer) of FIG. 11.

Referring to FIG. 9, the conductive material such as copper can be vapor deposited or printed on a substrate 2 such as a thermoplastic layer or film. FIG. 9 is illustrates a portion 60 of a core sheet 50, which includes a plurality of antenna structures 20 and interconnects 62 including conductive pads 64. The antenna structures 20 and the interconnects 64 comprise a conductive material such as metal or metal alloy printed on the substrate in accordance with some embodiments. For example, the conductive material is copper or copper alloy in some embodiments. In FIG. 9, six sets of antenna structures 20 and the interconnects 64 are for illustration only. The number of sets of antenna structures 20 and the interconnects 64 may be the same as the number of information carrying cards to be made simultaneously, for example, as illustrated in FIG. 1 and FIG. 12.

The present disclosure also provides a core sheet 50 comprising an antenna structure 20 and an SiP 40 as described herein.

Figure 10:
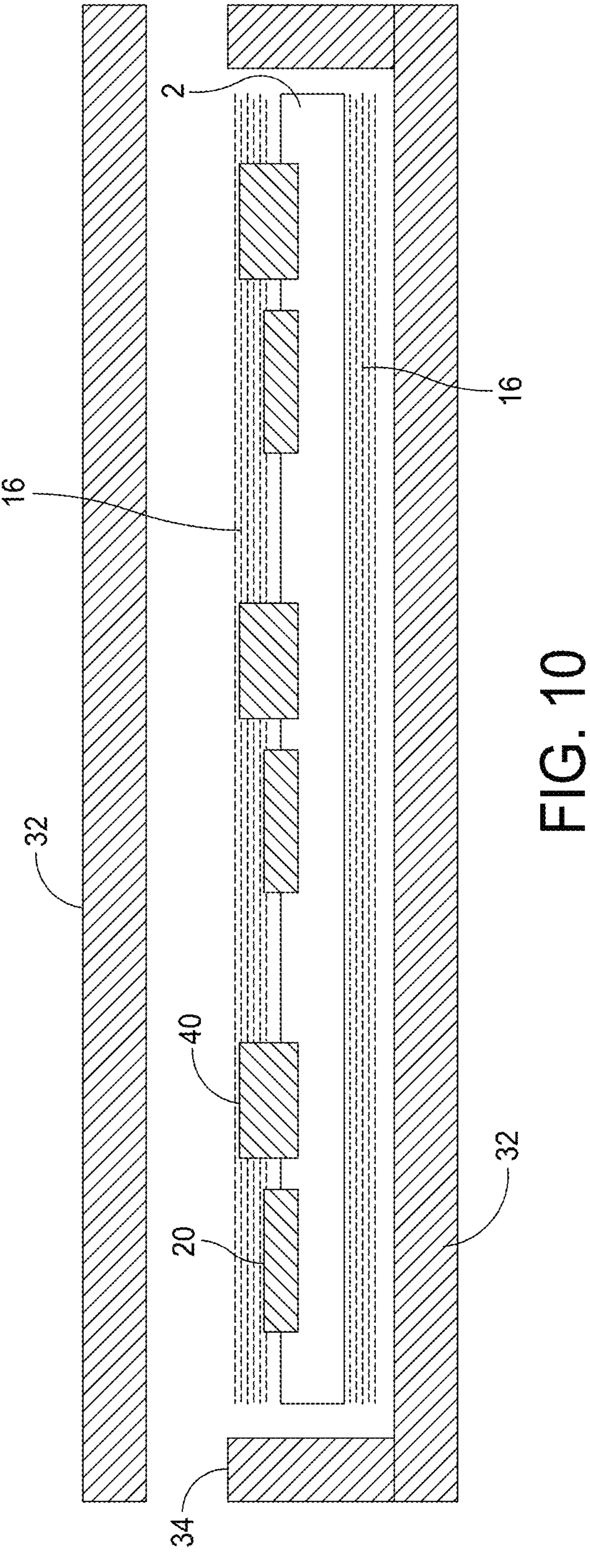
FIG. 10 is a sectional view illustrating an exemplary core (or core layer) for a plurality of information carrying cards in a manufacturing process, in which a cross-linkable polymer composition are applied to both sides of a core sheet, in accordance with some embodiments.
Figure 11:
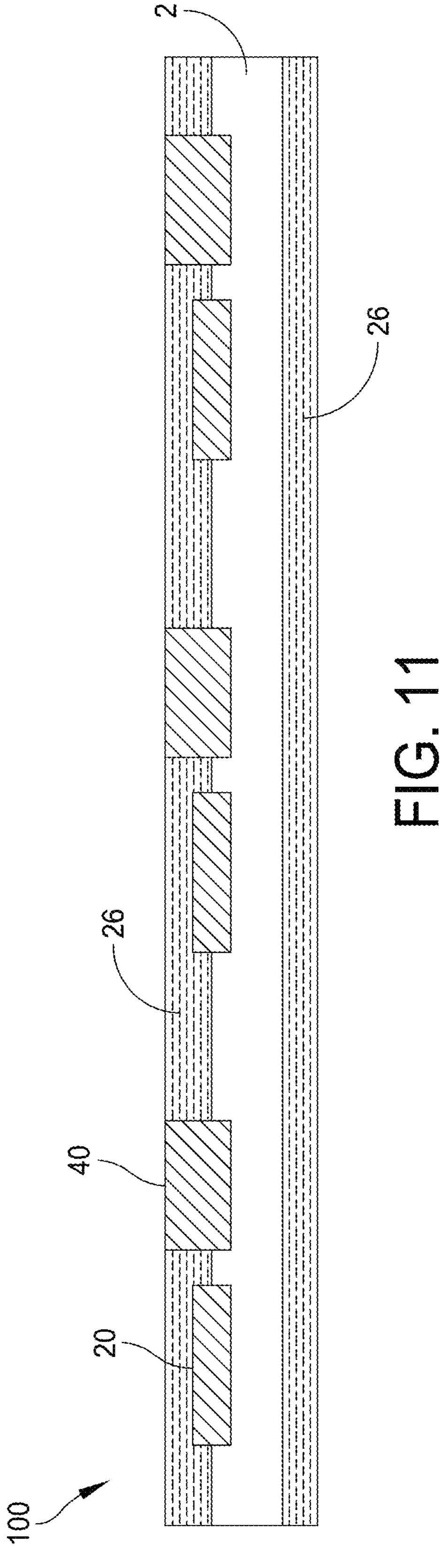
FIG. 11 is a sectional view illustrating an exemplary core (or core layer) for a plurality of information carrying cards comprising a crosslinked polymer composition on both sides of a core sheet, in accordance with some embodiments.

Referring to FIG. 10, a method of making the core layer 100 is illustrated. The resulting core layer 100 is illustrated in FIGS. 11 and 12.

In such a method, a crosslinkable polymer in a liquid or paste 16 form is applied to both sides of the core sheet 50 in a press for thermal lamination. The “press” used herein can be also called “a mold” or “a plating system.” The press 32 includes a height adjustment edges 34 to define the thickness. In some embodiments, the core sheet 50 includes a substrate layer 2 such as a first thermoplastic layer made of a thermoplastic polymer, and an antenna structure 20 and a SiP 40 disposed on or embedded within the first thermoplastic layer.

The substrate film 2 is centered in the crosslinkable composition 16 in a direction normal to a plane of the core layer 100. During a thermal lamination process for making the core layer, the core sheet self-centered in a crosslinkable polymer composition 16 before the crosslinkable polymer composition 16 is cured to become the crosslinked polymer composition 26.

In some embodiments, the core sheet 50 is self-centered in a cross-linkable polymer during curing in a thermal lamination process under a temperature and a pressure.

A cross-linkable polymer composition used often comprises a curable base polymer resin in a liquid or paste form or may be in a form of a hot melt adhesive. The cross-linkable polymer composition also comprises at least one initiator and/or curative for thermal curing, thermal curing, or a combination thereof. The cross-linkable polymer composition may optionally comprises other additives or fillers such as a particulate thermoplastic filler. The base polymer resin may be selected from the group consisting of urethane acrylate, ester acrylate, silicone acrylate, epoxy acrylate, acrylate, epoxy, and urethane. The acrylate may be a methacrylate. The particulate thermoplastic filler may be polyolefin, polyvinyl chloride (PVC), a copolymer of vinyl chloride and at least another monomer, or a polyester such as polyethylene terephthalate (PET). The particulate thermoplastic filler may be a compound or a blend comprising a thermoplastic resin, for example, a compound or a blend comprising PVC or a vinyl chloride copolymer. The at least another monomer in the vinyl chloride co-polymer may be vinyl ester, vinyl acetate or vinyl ether.

The base polymer resin may be an oligomer or prepolymer having functional groups. The base polymer can be cross-linkable under a regular curing conditions including but not limited to heating, radiation such as ultraviolet (UV) light, moisture and other suitable conditions. The base polymer may be in liquid or paste form. Its viscosity may be in the range of 100-100,000 cps, for example, from 1,000 cps to 20,000 cps, from 2,000 cps to 20,000 cps, from 3,000 cps to 12,000 cps, or from 3,000 cps to 8,000 cps. In some embodiments, the base polymer resin is urethane acrylate or epoxy.

In some embodiments, an epoxy or urethane acrylate is preferred. Such an epoxy or urethane acrylate is thermally curable or radiation such as UV or visible light curable, and are unfilled. After crosslinked, the cured polymer is optically transparent while electrically insulative.

The initiator and/or curative may be based on general principles of polymer chemistry. In some embodiments, the composition comprises thermal curing mechanism only, and can be cured at relatively low temperature such as above 40° C. and less than 150° C. or 120° C. In some embodiments, the composition comprises a dual curing mechanism. For example, the cross-linkable composition comprises a first curative for thermal curing and a second curative for radiation curing. During the curing or cross-linking reaction, such a cross-linkable composition transforms into a solid cross-linked polymer composition. Such a cross-linked polymer composition is also known in the art as a “thermosetting” polymer or “thermoset” to distinguish it from a thermoplastic polymer, which does not have a crosslinked structure. In some embodiments, the cross-linkable polymer composition comprises a range of from about 60 wt. % to about 99.5 wt. %, and preferably in the range of about 50 wt. % to about 95 wt. %, of the base polymer. The cross-linkable polymer composition optionally comprises a range of about 0.5 wt. % to about 40 wt. % such as about 5 wt. % to about 15 wt. %, of the additives such as a particulate thermoplastic filler. It is preferably to have a transparent crosslinkable polymer composition, which retains transparency after cross-linked.

Such a cross-linkable polymer composition 16 is transformed into a cross-linked polymer composition 26 after a curing reaction under suitable conditions, for example, under a thermal or radiation condition or a thermal condition in combination with a radiation condition. The radiation can be ultra-violet (UV), visible light, or infra-red (IR). In some embodiments, under such a thermal condition, the curing reaction occurs at a relatively low temperature, for example, less than 150° C., less than 120° C., or less than 100° C. Exemplary suitable temperature may be in a range of from 40° C. to 150° C., from 40° C. to 120° C., from 40° C. to 100° C., from 50° C. to 150° C., from 50° C. to 120° C., from 50° C. to 100° C., from 60° C. to 150° C., from 60° C. to 120° C., from 60° C. to 100° C., from 70° C. to 150° C., from 70° C. to 120° C., or from 70° C. to 100° C.

The cross-linkable polymer composition can be dispensed using a suitable dispensing apparatus or equipment for adhesives, encapsulants, sealants and potting compounds, for example, a robot with dispensing function. The amount to the cross-linkable polymer composition 16 to be dispensed can be calculated and controlled. For example, the thickness of the cross-linkable polymer composition 16 may be about 0.025 mm or less, for example, in a range of from 0.005 mm to 0.025 mm.

During the stage of manufacturing a core or core layer for one or more information carrying card, a layered structure is formed. The layered structure can be degassed and then pressed within a press. The edges of the press may include spacers or the edges of the press may function with spacers to control the thickness of the layered structure after cured. The layered structure may be heated when it is pressed.

The crosslinkable polymer composition is cured under a pressure and a temperature. For example, it is cured at a raised temperature of above 40° C. and less than 150° C. such as about 90-100° C.) under a pressure of less than 2 MPa. The crosslinkable polymer composition becomes a crosslinked polymer composition, which is in a solid form, but may have flexibility. In some embodiments, the polymer composition is transparent before and after cross-linked.

When the layered structure is degassed, pressed, and/or cured, in this unique design, the inlay layer can move freely, thus self-center, inside the crosslinkable polymer composition. The core sheet can move and center in a direction along vertical direction of the mold. In another word, the inlay layer can move and center vertically and normal to a plane of the thermoplastic layer.

A suitable temperature for curing would be one that is sufficiently high to cure the cross-linkable polymer composition. Hot lamination of the thermoplastic layers may also occur for any areas without having crosslinkable polymer composition. After the heat treatment, the cross-linkable polymer composition forms a solid. Such a cross-linked polymer composition has good adhesion with each thermoplastic layer and inlay layer 8 including electronic component and supporting film. In some embodiments, such a cross-linked composition is more flexible than any of the thermoplastic layers used. In some embodiments, curing methods such as visible light, UV or other radiation curing can be also used, separately or in combination with thermal curing. It may also comprise a step of curing via the introduction of moisture or the promotion of other chemical reactions.

In some embodiments, the crosslinked polymer composition may have a hardness (Shore D) in a range from 10 to 85, for example, from 20 to 80, a tensile strength in a range of from 20 MPa to 100 MPa, for example, from 30 MPa to 60 MPa, an elongation in a range of from 1% to 20%, for example, from 2% to 10%, and a Young's modulus in a range of from 0.5 GPa to 8 GPa, for example, from 1 GPa to 5 GPa, following ASTM testing standards.

Figure 13:
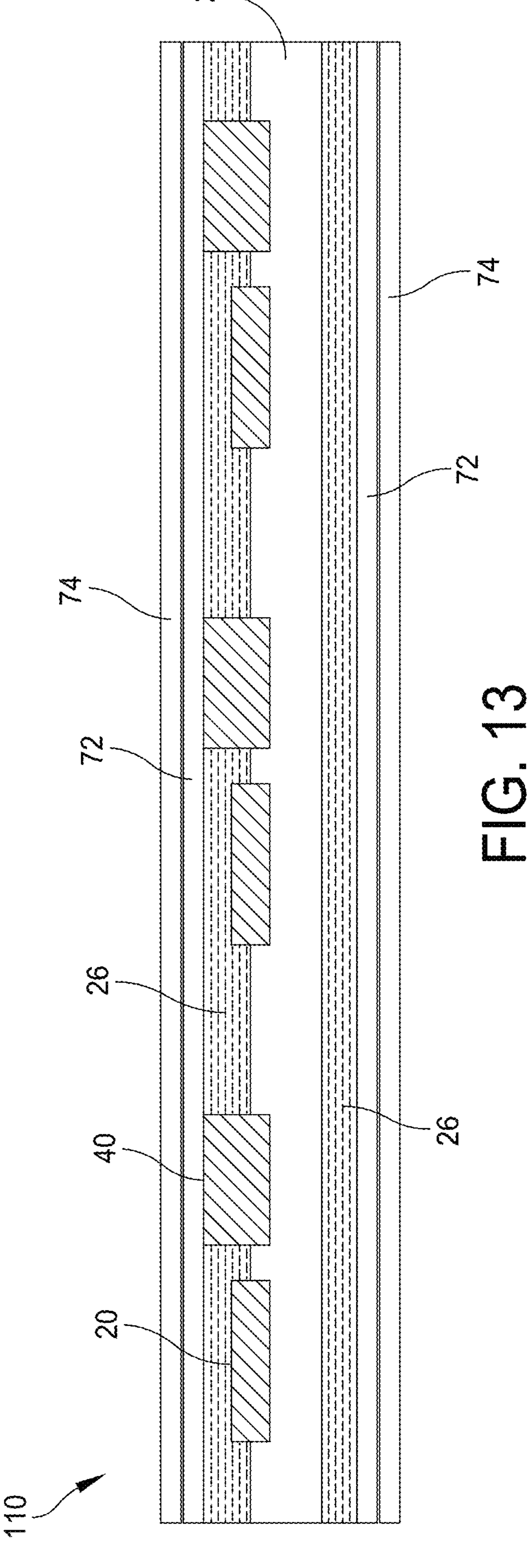
FIG. 13 is a sectional view illustrating a plurality of information carrying cards being made in accordance with some embodiments.
Figure 14:
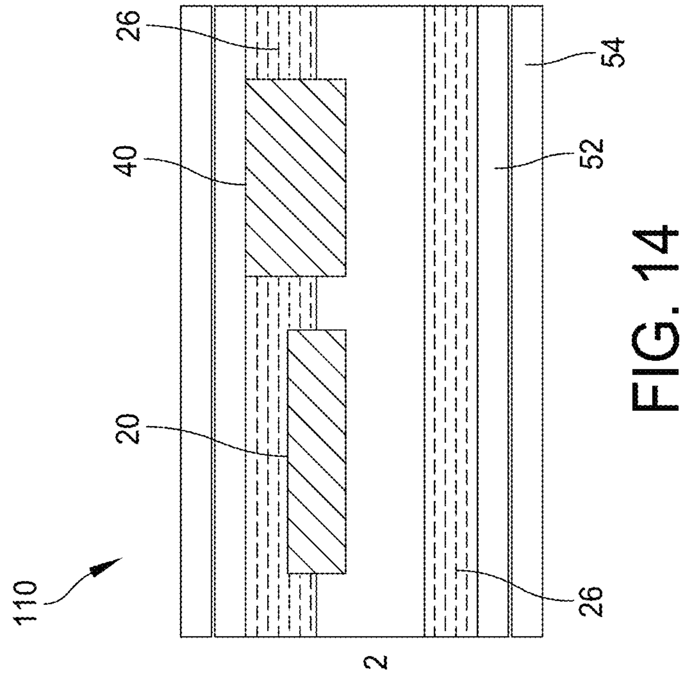
FIG. 14 is a section view illustrating an information carrying card after a step of cutting from the plurality of information carrying cards shown in FIG. 13. The dimensions are not based on the actual scale, and the drawings are for the purpose of illustration only.

FIGS. 11-12 illustrate an exemplary core layer 100 comprising the exemplary core sheet as described herein. FIG. 13 illustrates a plurality of exemplary information carrying cards 110. FIG. 14 illustrates one exemplary information carrying card 110.

In accordance with some embodiments, a core layer 100 is configured to be used for making a plurality of information carrying cards 110. Such a core layer 100 comprises a substrate 2, and a plurality of component sections 10, which together are referred as a core sheet 50. Each component section 10 comprises an antenna structure 20 disposed on or embedded within the substrate film 2. The antenna structure 20 comprises a wire made of a conductive material. Each section 10 further comprises a system-in-package (SiP) 40 comprising at least one chip disposed on or embedded within the substrate film 2, and electrically connected with the antenna structure 20.

The present disclosure also provides a core layer 100 comprising an antenna structure 20 and an SiP 40 as described herein. The core layer further comprises a cross-linked polymer composition 26 disposed on both side of the substrate film 2. In some embodiments, the core layer 100 further comprises a light emitting diode (LED) 46 electrically connected with the SiP and the antenna.

In another aspect, the present disclosure provides a method of making the core sheet and a core layer as described herein. The antenna structure are formed as described herein. The SiP is applied and connected with the antenna structure as described herein.

Figure 15:
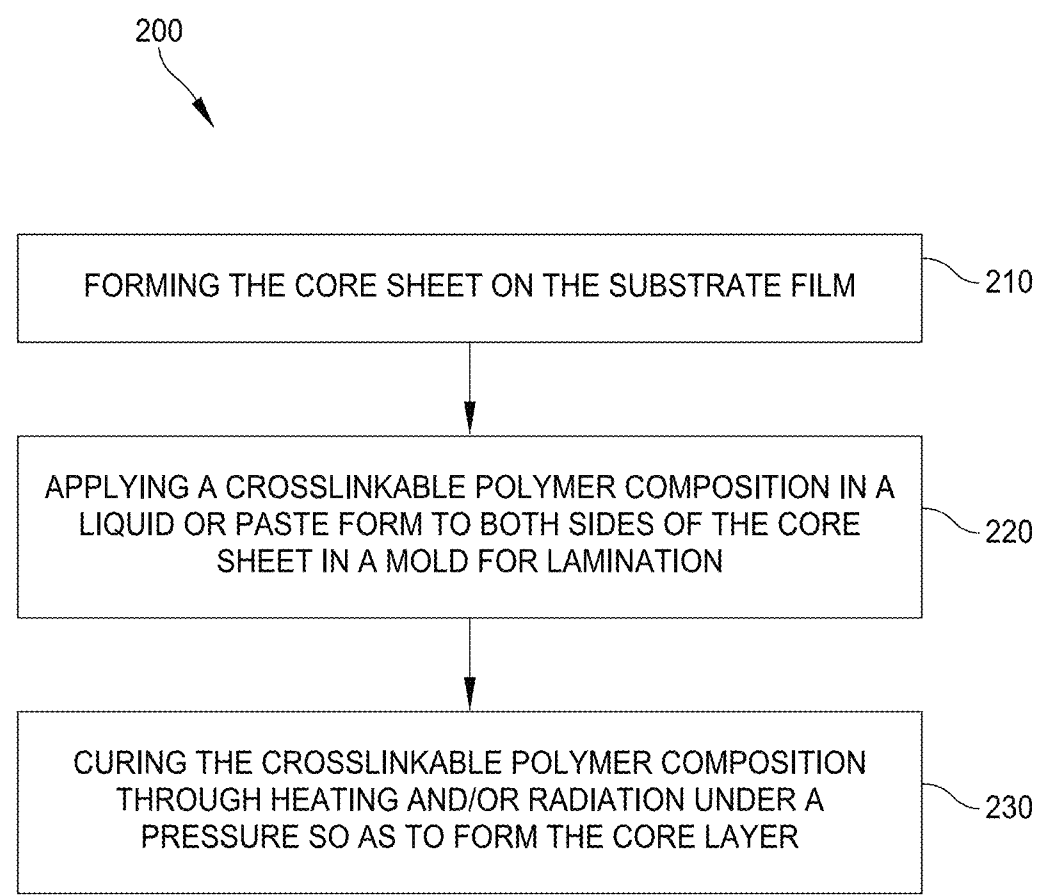
FIG. 15 is a flow chart illustrating an exemplary method of making a core layer for a plurality of information carrying card in accordance with some embodiments.
Figure 16:
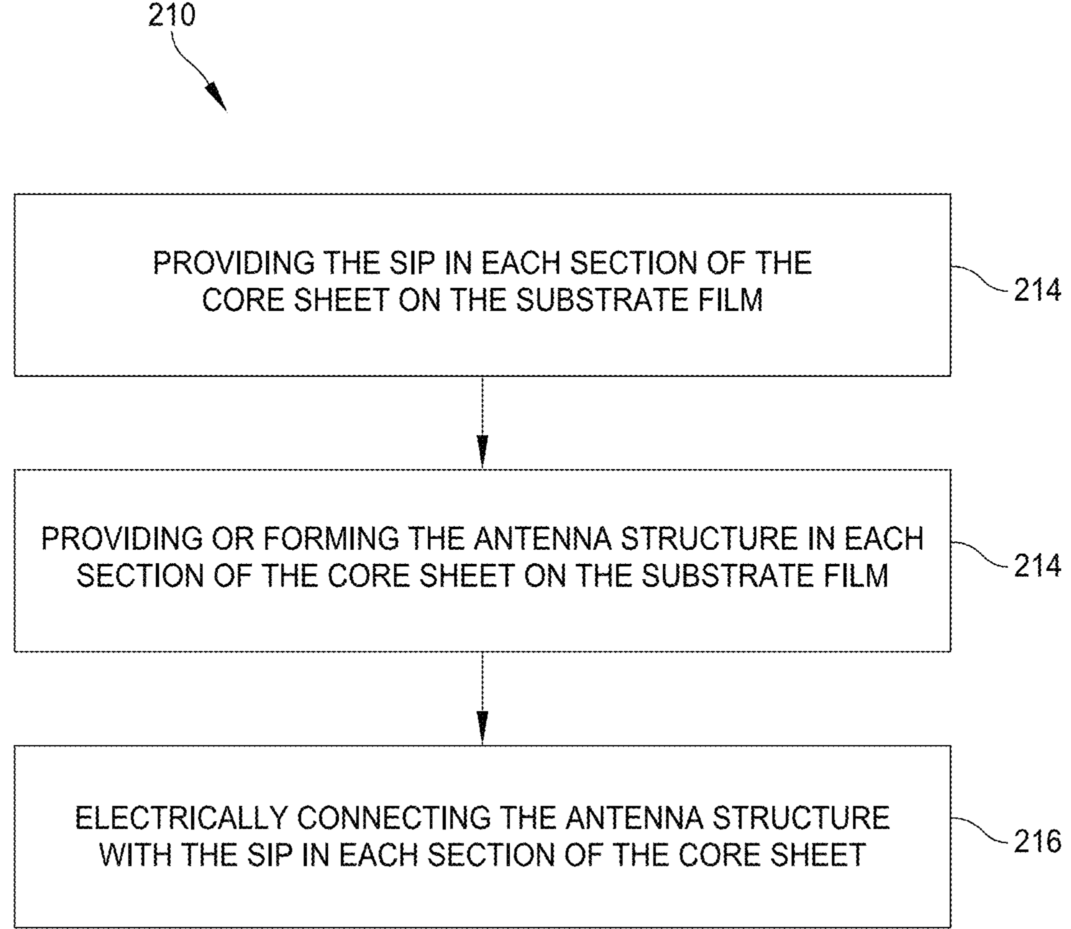
FIG. 16 is a flow chart illustrating an exemplary method of making a core sheet having a plurality of sections in accordance with some embodiments.

FIG. 15 is a flow chart illustrating an exemplary method 200 of making a core layer for a plurality of information carrying card in accordance with some embodiments. FIG. 16 is a flow chart illustrating an exemplary method 210 of making a core sheet having a plurality of sections in accordance with some embodiments.

At step 210, the core sheet 50 is formed on the substrate film 2.

Referring to FIG. 16, the step of forming the core sheet 50 on the substrate film 2 comprises steps 212, 214, and 216. At step 212, the SIP 40 in each section 10 of the core sheet 50 is provided onto the substrate film 2. At step 214, the antenna structure 20 in each section of the core sheet is provided or formed on the substrate film 2. The conductive material in the antenna structure 20 can be applied on the substrate film 2 through vapor deposition, printing, or cladding technique, or any combination thereof.

At step 216, the antenna structure 20 is electrically connected with the SIP 40 in each section 10 of the core sheet 50. In some embodiments, the antenna structure and the SiP are connected by laser melting (wire bonding or solder) of the conductive material or by a conductive tape.

Referring back to FIG. 15, at step 220, a crosslinkable polymer composition 16 in a liquid or paste form is applied to both sides of the core sheet 50 in a press for lamination.

At step 230, the crosslinkable polymer composition 16 is cured through heating and/or radiation under a pressure so as to form the core layer. The crosslinkable polymer composition 16 is converted into the crosslinked polymer composition 26. During a curing process at a low temperature and under a pressure, the core sheet self-centers in the press with the help of the crosslinkable polymer. In some embodiments, the core layer 100 comprises a crosslinked polymer disposed on both side of the core layer. In some embodiments, the core sheet is self-centered in the crosslinked polymer before curing in a thermal lamination process under a temperature and a pressure.

In another aspect, the present disclosure provides a core sheet or a core layer for a plurality of information carrying cards. The core layer comprising a core sheet having a plurality of core sections as described herein. The present disclosure also provide the resulting core sheet, the resulting core layer, and the resulting information carrying card.

In some embodiments, the core layer comprises a crosslinked polymer disposed on both side of the core layer. In some embodiments, the core sheet is self-centered in the crosslinked polymer before curing in a thermal lamination process under a temperature and a pressure. In such a method, a crosslinkable polymer in a liquid or paste form is applied to both sides of the core sheet in a press for thermal lamination. The press includes a height adjustment edges to define the thickness. During a curing process at a low temperature and under a pressure, the core sheet self-centers in the press with the help of the crosslinkable polymer.

In some embodiments, the core layer includes a plurality of section and is configured to be for a plurality of information carrying cards. Each section comprises one antenna structure and a SiP.

In some embodiments, the following steps are used in an exemplary process:

1. A first thin (e.g., 0.012 mm to 0.0508 mm) PVC or other suitable material as the substrate film is placed flat. A paper or paper-based products can be also used depending on choice of construction.

2. A first portion of the crosslinkable polymer composition is dispersed onto the substrate film. The composition may be an epoxy group containing polymer. A heat and/or UV curable composition can be used. A sheet-based adhesive can be also used depending on the solution being utilized. Options exist due to the prevalence and desire to move to more eco-friendly products. An adhesive sheet at this layer is used depending on substrate used.

3. One of the core sheet is applied onto the substrate layer with a cross-linkable composition dispensed, while centering it to either registration holes or sheet size.

4. A second portion (or layer) of the crosslinkable polymer composition is dispersed onto the top of the core sheet. A window-cut adhesive sheet can be also used depending on substrate choice.

5. A second thin (e.g., 0.012 mm to 0.0508 mm) PVC or other suitable material is applied on top of the second portion of the crosslinkable polymer composition.

6. This layer of PVC may be sealed if required by the material used. If a liquid crosslinkable composition is used, the combined layers is vacuumed to remove all and any air that may have entered the array/stack up.

7. The stack-up layered structure is placed into plating system, which may include shimmed plate or normal plate set-up.

8. The crosslinkable polymer composition is cured either by using temps of 40-150° C. or radiation such as UV. UV can be also used depending on desired product to be made. When UV is used, no heating may be required. No heat is needed for a pressure activated cold adhesive.

The PVC films can be replaced with any other thermoplastic layers such as PET films or other suitable substrate films.

In another aspect, the present disclosure provides an information carrying card comprising the core sheet or the core layer as described herein. In another aspect, the present disclosure provides a method of making the core sheet as described herein. In another aspect, the present disclosure provides a method of making the core layer as described herein.

In another aspect, the present disclosure provides a method of making one or a plurality of the information carrying cards as described herein.

FIG. 13 is a sectional view illustrating a plurality of information carrying cards being made in accordance with some embodiments.

FIG. 14 is a section view illustrating an information carrying card after a step of cutting from the plurality of information carrying cards shown in FIG. 13. The dimensions are not based on the actual scale, and the drawings are for the purpose of illustration only.

A plurality of information carrying cards are made through hot lamination.

A transparent thermoplastic film may be laminated on each side of the core layer through hot lamination. A transparent thermoplastic film may be optional.

A transparent film 74 can be used as the outer layer of an information carrying card. Examples of transparent film include but are not limited to PVC, modified PVC and PET.

A printable thermoplastic film 72 is laminated on one or both sides of the core layer through hot lamination.

A printable thermoplastic film layer may be disposed onto on the core layer directly, or on a transparent film, which may be laminated onto the core layer first. The printable thermoplastic film is an imaging receiving layer. Words or images can be printed onto the printable thermoplastic film before or during a process of making an information card. In some embodiments, this film is not transparent, and contains some pigments such as white pigments.

The order of the transparent film and the printable thermoplastic film may be interchangeable.

A suitable temperature for hot lamination is sufficiently high so that all the films are laminated with good adhesion. In some embodiments, the temperature is in the range of 65-232° C. In some embodiments, the temperature is less than 150° C.

The uses of the final products may include, but are not limited to, SIP inserts, display technologies, toys, auto motive uses, packaging of components for other industries or other devices. The products may include, but are not limited to cards, key chain tags, and pet products (e.g., for tracking). Metal card and tag or other form factor creations can be made. Instead of metal, other suitable materials such as ceramics, wood may be also used.

The overall process with this technology to make the core sheet and core layer saves manufacturing cost significantly while also improving the performance. In some embodiments, the manufacturing cost decrease by at least 90%.

The inventor's previous patents and patent applications, for example, U.S. 10,339,434, and U.S. application Ser. No. 17/970,155, are incorporated herein by references. The descriptions on material selections and general procedures for making a plurality of information carrying cards can be applicable to the products and the methods of the present disclosure.

The core layer may also include other additional layers or components based on different product design. For example, additional thermoplastic layers may be used. The core layer may also comprise a piece of metal, ceramic or plastic materials in the core layer of some information carrying cards. The piece of metal such as steel may be separate from the inlay layer 8 and is for decoration or weight only. The core layer having a piece of metal can be used to make "metal cards," which are a type of information carrying card weighing more than an information carrying card without such a piece of metal. In some embodiments, the piece of metal has a size large enough to provide edges for an information carrying card. After the process for making the information carrying card including final cutting steps, the edges of the metal piece are exposed and define the exterior edges of the resulting metal cards.

Although the subject matter has been described in terms of exemplary embodiments, it is not limited thereto. Rather, the appended claims should be construed broadly, to include other variants and embodiments, which may be made by those skilled in the art.

What is claimed is:

1. A core layer, comprising:

a substrate film;

a core sheet comprising a plurality of component sections, wherein each component section comprises an antenna structure disposed on or at least partially embedded within the substrate film, the antenna structure comprising a wire made of a conductive material, and a system-in-package (SiP) comprising at least two chips disposed on or embedded within the substrate film, and electrically connected with the antenna structure; and a crosslinked polymer composition disposed on both side of the substrate film, wherein the substrate film is centered in the crosslinked composition in a direction normal to a plane of the core layer.

2. The core layer of claim 1, wherein the substrate film comprises a polymer, a paper, plasticized paper, a composite, or any combination thereof.

3. The core layer of claim 1, wherein the substrate film is a first thermoplastic layer made of a thermoplastic polymer.

4. The core layer of claim 1, wherein the antenna structure is made of a wire or a thread, and the conductive material comprises a metal.

5. The core layer of claim 1, wherein the conductive material is made of copper or copper alloy.

6. The core layer of claim 1, wherein the antenna structure and the system-in-package are connected by laser melting of the conductive material or by a conductive tape.

7. The core layer of claim 1, wherein the system-in-package comprises at least three chips for different functions.

8. The core layer of claim 1, wherein the antenna structure is configured to generate energy through induction in magnetic field, and the core layer includes no battery.

9. The core layer of claim 1, further comprising a light emitting diode (LED) electrically connected with the SiP and the antenna structure.

10. The core layer of claim 1, wherein a core sheet including the substrate film, the antenna structure and the SiP is self-centered in a crosslinkable polymer during curing in a thermal lamination process under a temperature and a pressure.

11. A method of making the core layer of claim 1, comprising forming the core sheet on the substrate film;

applying a crosslinkable polymer composition in a liquid or paste form to both sides of the core sheet in a press for lamination; and curing the crosslinkable polymer composition through heating and/or radiation under a pressure so as to form the core layer, wherein the crosslinkable polymer composition is converted into the crosslinked polymer composition.

12. The method of claim 11, wherein forming the core sheet on the substrate film comprises:

providing the SIP in each section of the core sheet on the substrate film;

providing or forming the antenna structure in each section of the core sheet on the substrate film; and electrically connecting the antenna structure with the SIP in each section of the core sheet.

13. The method of claim 12, wherein the antenna structure and the SiP are connected by laser melting of the conductive material or by a conductive tape.

14. The method of claim 11, wherein the conductive material in the antenna structure is applied on the substrate film through vapor deposition, printing, or cladding technique, or any combination thereof.

15. The core layer of claim 1, wherein the core layer is configured to be used for making a plurality of articles for information carrying, and the plurality of articles are cards, tags, or inserts.

16. The core layer of claim 1, wherein the antenna structure comprises a first portion including a number of loops and a second portion including a waveform structure.

17. An article for information carrying, comprising a core layer, the core layer comprising:

a substrate film;

a core sheet, each section of the core sheet comprising an antenna structure disposed on or at least partially embedded within the substrate film, the antenna structure comprising a wire made of a conductive material, and a system-in-package (SiP) comprising at least two chips disposed on or embedded within the substrate film, and electrically connected with the antenna structure; and a crosslinked polymer composition disposed on both side of the substrate film, wherein the substrate film is centered in the crosslinked composition in a direction normal to a plane of the core layer.

18. The article of claim 17, wherein the substrate film comprises a polymer, a paper, plasticized paper, a composite, or any combination thereof.

19. The article of claim 17, wherein the substrate film is a first thermoplastic layer made of a thermoplastic polymer.

20. The article of claim 17, wherein the antenna structure is made of a wire or a thread, and the conductive material comprises a metal.

21. The article of claim 17, wherein the conductive material is made of copper or copper alloy.

22. The article of claim 17, wherein the antenna structure and the system-in-package are connected by laser melting of the conductive material or by a conductive tape.

23. The article of claim 17, wherein the system-in-package comprises at least two or three chips for different functions.

24. The article of claim 17, wherein the antenna structure is configured to generate energy through induction in magnetic field, and the core layer includes no battery.

25. The article of claim 17, further comprising a light emitting diode (LED) electrically connected with the SiP and the antenna structure.

26. The article of claim 17, wherein a core sheet including the substrate film, the antenna structure and the SiP is self-centered in a crosslinkable polymer during curing in a thermal lamination process under a temperature and a pressure.

27. A method of making one or a plurality of the articles according to claim 16, comprising:

making the core layer comprising a plurality of sections.

28. A method of claim 27, wherein the making the core layer comprises:

forming the core sheet on the substrate film;

applying a crosslinkable polymer composition in a liquid or paste form to both sides of the core sheet in a press for lamination; and curing the crosslinkable polymer composition through heating and/or radiation under a pressure so as to form the core layer, wherein the crosslinkable polymer composition is converted into the crosslinked polymer composition.

29. The method of claim 28, wherein forming the core sheet on the substrate film comprises:

providing the SIP in each section of the core sheet on the substrate film;

providing or forming the antenna structure in each section of the core sheet on the substrate film; and electrically connecting the antenna structure with the SIP in each section of the core sheet.

30. The article of claim 17, wherein the article is a card, a tag, or an insert.

* * * * *